United States Patent Office 3,490,862
Patented Jan. 20, 1970

3,490,862
METHOD FOR UNIFORM ACETYLATION IN THE ANHYDROUS GAS-PHASE ACETYLATION REACTION OF FIBERS
Tatsuro Yoda and Takane Nomura, Kitashima, and Toshiyuki Harada, Ishii, Japan, assignors to Toho Rayon Kabushiki Kaisha, Tokyo, Japan, a corporation of Japan
No Drawing. Filed Sept. 15, 1966, Ser. No. 579,482
Claims priority, application Japan, Sept. 20, 1965, 40/57,115
Int. Cl. D06m *13/20*
U.S. Cl. 8—121                                    6 Claims

ABSTRACT OF THE DISCLOSURE

Preparation of cellulose acetate fibers by treating viscose rayon fibers with an aqueous solution of alkali acetate containing polyethylene glycol, ethylene glycol, glycerine or polypropylene glycol or acetic acid esters of such polyhydric alcohols, drying such treated fibers and then exposing the same to an acetylating gas.

---

The present invention relates to an improved method for preparing cellulose acetate fibers by gas or vapor phase acetylation of cellulosic fibers.

Known procedures for effecting an anhydrous vapor phase acetylation of cellulosic fibers involve, in general, deposition of an acetylation catalyst onto the cellulosic fibers followed by exposure of such fibers to an acetic anhydride gas or vapor. The deposition of the acetylation catalyst onto cellulosic fibers is achieved, for example, by merely soaking the fibers in an aqueous solution of an alkaline acetate, such as sodium acetate, potassium acetate, etc., followed by dehydrating, as by squeezing or centrifuging, and complete drying of the treated fibers.

It has been found that with these known procedures portions of the treated cellulosic fibers often do not possess sufficient catalyst for effecting the desired acetylation reaction. These portions are thus not acetylated when the treated fibers are exposed to the acetic anhydride gas or vapor and are referred to as "acetylation spots." The presence of such acetylation spots is, obviously, objectionable in the finished product.

One measure taken to overcome this problem is to deposit on the cellulosic fibers an amount of acetylation catalyst which is far in excess of that which is actually necessary for the desired acetylation reaction. This may be achieved by employing a high concentration of catalyst in the initial aqueous soaking solution or by reducing the degree to which the cellulosic fibers are dehydrated following the soaking step. While this procedure generally provides all portions of the cellulosic fibers with sufficient catalyst for supporting the acetylation reaction, the amount of catalyst attached to some portions of such fibers greatly exceeds that which is actually necessary or desired.

Aside from economy, the use of excess acetylation catalyst is objectionable for many reasons. For example, since the amount of acetic acid adhering to the acetylated fibers; that is, the cellulose acetate obtained upon completion of the acetylation reaction, is generally in proportion to the amount of catalyst initially applied to the cellulosic fibers, the more catalyst employed the greater the loss of acetic acid becomes. Secondly, when cellulosic fibers containing an excess or catalyst are exposed to the acetylation gas or vapor, substantial quantities of catalyst particles are dislodged. These particles not only serve as nuclei for the formation of scales but encourage the accumulation of scales within the acetylation apparatus where they eventually obstruct or interfere with the acetylation reaction itself. Further, with the application of an excess of acetylation catalyst, the cellulosic fibers become hardened and, in this condition are more susceptible to damage at each of the processing stages. Lastly, the greater the amount of catalyst which is attached to the cellulosic fibers, the higher become the thermal as well as physical losses of catalyst during each process step in which the catalyst is involved.

Accordingly, a primary object of this invention is to provide a generally new or improved and more satisfactory method for preparing cellulose acetate fibers by gas or vapor phase acetylation of cellulosic fibers.

Another object is the provision of an improved method involving acetic anhydride vapor treatment of catalyst-containing cellulosic fibers in which a minimum amount of acetylation actalyst is employed and a minimum loss of catalyst and acetic acid is experienced.

Still another object is an improved method for the gas or vapor phase acetylation of cellulosic fibers which involves little or no fiber damage or loss in efficiency of the treating apparatus.

The above and other objects are achieved by the method of the present invention which, in general, includes the steps of treating, as by soaking, cellulosic fibers in an aqueous solution containing an acetylation catalyst and a polyhydric alcohol or its acetic acid ester, and thereafter subjecting the thus treated fibers to the conventional steps of dehydration, drying, and exposure to an acetic anhydride gas or vapor. As a result of the addition of polyhydric alcohols or their acetic acid esters into the soaking solutions, uniform deposition of acetylation catalyst onto the cellulosic fibers is provided. When such treated fibers are exposed to the acetylation gas or vapor, uniform and complete acetylation is achieved, using as little as one-half to one-third of the amount of catalyst normally required in conventional vapor-phase acetylation procedures. This reduction in catalyst requirements, which is brought about by the use of polyhydric alcohols or their acetic acid esters, of course minimizes the loss of acetic acid and catalyst, prevents the formation of scales, and renders the fibers less susceptible to damage during processing.

Acetylation spots, as heretofore mentioned, occur when the average amount of catalyst attached to the cellulosic fibers is less than that required to effect the desired acetylation reaction. The method of the present invention is based upon our discovery that in conventional procedures, a mass of cellulosic fibers which has been soaked in an aqueous solution of catalyst, dehydrated, and then dried exhibits a considerable difference between the amount of catalyst which is attached to the surface of such mass and that which appears at the interior of such mass. We believe that during the drying of such treated cellulosic fiber mass, catalyst solution is drawn from the interior of the mass to its surface and, as a result, the amount of catalyst which remains attached to the dried fibers which are within the fiber mass itself is insufficient for the desired acetylation reaction. This tendency becomes more pronounced with larger and more dense fiber masses, or when the concentration of the catalyst in the aqueous solution is reduced, or when the fiber mass is less drastically dehydrated prior to drying.

Since alkali metal salts of acetic acid are highly soluble in water we believe that, even after the drying of the soaked and dehydrated fiber mass has progressed to significantly raise the concentration of the solution in the interior of the fiber mass, the movement of the catalyst continues from within and toward the surface of such fiber mass with further drying. As a result of these discoveries, and in accordance with the method of the present invention, the solubility of the catalyst salt in the aqueous solution is reduced by the addition of polyhydric alcohols or their acetic acid esters. Thus, during the drying of a mass of cellulosic fibers which has been soaked in such solution and dehydrated, the concentration of the catalyst within the fiber mass increases and results in the catalyst precipitating out onto the fiber mass rather than being drawn to the surface of such mass along with the water which is being removed.

We have found that polyhydric alcohols or their acetic acid esters perform the above-noted function well, with polyethylene glycols being the most effective and thus the preferred additive. However, ethylene glycol, glycerine, polypropylene glycol, or their acetic acid esters can also be employed with good results. While these additives become attached to the fibers along with the catalyst, they in no way alter or damage the fibers themselves. An added advantage of polyhydric alcohols and their acetic acid esters is that they remain stable at the high temperatures employed during drying and the acetylation reaction. Further, if any of such additives remain on the acetylated fibers, they can be removed along with the catalyst and recovered for reuse.

The amount of polyhydric alcohols or their acetic acid esters employed in the aqueous solutions of alkali acetate catalyst is desirably within the range of from 10% to 50%, by weight, and preferably in the range of 20% to 30%, by weight. The latter range facilitates satisfactory recovery of such additives without involving any substantial sacrifice in the benefits which might be achieved by using a larger amount of additive and less catalyst. When using an amount of polyhydric alcohols within the preferred range, the concentration of alkali acetate catalysts can be lowered to about ½ to ⅓ of the minimum amount generally employed in known conventional procedures.

For example, after soaking a mass of viscose rayon fibers in a conventional aqueous soaking solution containing a sodium acetate catalyst; that is, without the addition of polyhydric alcohols or their acetic acid esters, it is necessary that such fiber mass, after dehydrating and drying, have an average of at least 15% of sodium acetate, in terms of the amount attached to the fibers, to effect the acetylation reaction without the presence of acetylation spots. When the average amount of catalyst attached to the fiber mass falls below this minimum amount, acetylation is not complete and acetylation spots exist at the interior of the mass.

On the other hand, with the method of the present invention it has been found that after soaking a mass of viscose rayon fibers in an aqueous solution comprised of 30% polyethylene glycol, by weight, and 5% sodium acetate, by weight, the average amount of catalyst attached to the fiber mass can fall to a level of 5% without acetylation spots being present in the mass after the acetylation reaction.

In accordance with the method of the present invention, the acetylation reaction can be successfully carried out; that is, without the presence of acetylation spots, using aqueous soaking solutions having extremely low concentrations of alkali acetate and with extremely low average amounts of catalysts attached to the fibers. It has been found that the polyhydric alcohols and their acetic acid esters not only prevent the movement of catalyst from within the fiber mass to the surface thereof during drying, but also tend to relax the dried fibers, thus permitting the acetylation reaction to be effected more readily. Further, the polyhydric alcohols and their acetic esters have a softening effect upon the fibers and improve the penetration action of the catalyst so that acetylated fibers of high quality are obtained. Although these particular additives to the aqueous catalyst solution do not have a direct effect upon the strength or elongation properties of the acetylated fibers, their presence on the fibers during the acetylation reaction minimizes fiber damage and preserves the good overall quality of the acetylated product.

During the acetylation reaction, a portion of the polyhydric alcohols present on such fibers becomes esterified. These esters, however, exhibit a high solubility in water, have high boiling points, and are substantially as effective as the polyhydric alcohols themselves. Thus, these esters can be removed and reused without any modification.

Preferably, the polyhydric alcohols or their acetic acid esters are added to the aqueous solution of the alkali acetate catalyst to maintain a concentration thereof within a range of from 10% to 50%, by weight. In such solution the concentration of the alkali acetate catalyst is preferably kept low but to a level at which the acetylation reaction will occur without the presence of acetylation spots. The cellulosic fibers to be acetylated are soaked, either at room temperature or in a heated condition, in this aqueous catalyst solution, then dehydrated by squeezing or centrifuging, and dried to an almost bone-dry condition. These treated fibers are then exposed to an anhydrous acetic acid vapor which is heated to a high temperature to effect acetylation as in the conventional procedures.

To illustrate the merits of the method of the present invention, the following examples are provided:

EXAMPLE 1

Polyethylene glycol (PEG), having a mean molecular weight of 1440, is added to aqueous solutions of sodium acetate to prepare a variety of soaking solutions having different concentrations of the additive. Individual masses of viscose rayon fibers are soaked in these solutions, wrung out at a wringing ratio of 2, and then dried at 100° C. for 50 minutes.

Using anhydrous acetic acid 47 mol percent, acetic acid 32 mol and air 21 mol percent, the treated fiber masses were acetylated at 140° C., with the reaction being continued for 40 minutes. As in conventional procedures, the acetic acid value of the fibers at which the acetylation reaction had progressed reached a value of 50%.

The individual fiber masses were washed in water for 10 minutes after the completion of the acetylation reaction and, immediately after the removal of the catalyst, were treated with a bath containing a blue direct dye, Japanol Brilliant Blue—6 BKX—0.0025% in a 0.25% mirabilite solution (Japanol Brilliant Blue—6 BKX is a tradename for a blue direct dye). The dye bath consisted of a 40 to 1 water to dye ratio, with the actual dyeing being done by boiling the masses in the bath for 30 minutes. The dyed fiber masses were water-washed for 10 minutes, wrung out, and then dried for 30 minutes. The portions of each fiber mass that was stained in the dye bath was determined and is set forth in Table 1 below. Since a wringing ratio of 2 was used, the fiber masses before drying each contained one part of solution against one part of fiber and, ideally speaking, the concentration of solution represented the final amount of catalyst attached to the fibers. It will be noted from Table 1 that as the concentration of polyethylene glycol (PEG) exceeded the level of 20%, by weight, little, if any stained area was observed, even when using 5% concentration, by weight, of sodium acetate.

TABLE 1

| | Percent | | | | | | | | | | | | | |
|---|---|---|---|---|---|---|---|---|---|---|---|---|---|---|
| PEG (by weight) | 0 | 0 | 0 | 0 | 5 | 5 | 10 | 10 | 20 | 20 | 30 | 30 | 30 | 30 |
| $CH_3COONa$ (by weight) | 5 | 10 | 15 | 20 | 5 | 10 | 5 | 10 | 5 | 10 | 3 | 5 | 7 | 10 |
| Stained area | 100 | 80 | 1 | 0 | 70 | 50 | 30 | 10 | 1 | 0 | 50 | 0 | 0 | 0 |

Note.—PEG and $CH_3COONa$ are expressed in terms of the concentrations of their aqueous solutions.

EXAMPLE 2

Individual masses of viscose rayon fibers were treated in the same manner as described above, with the exception that ethylene glycol (EG) was employed in place of polyethylene glycol. The results are set forth below in Table 2.

TABLE 2

| | Percent | | | | | | | |
|---|---|---|---|---|---|---|---|---|
| EG (by weight) | 0 | 0 | 5 | 10 | 20 | 30 | 30 | 50 |
| $CH_3COONa$ (by weight) | 5 | 10 | 5 | 5 | 5 | 5 | 8 | 5 |
| Stained area | 100 | 80 | 80 | 60 | 30 | 5 | 0 | 0 |

Note.—EG and $CH_3COONa$ are expressed in terms of the concentrations of their aqueous solutions.

EXAMPLE 3

Individual masses of viscose rayon fibers were treated in the same manner as described in Example 1 above, with the exception that glycerine was employed in plane of polyethylene glycol. The results are shown in Table 3.

TABLE 3

| | Percent | | | | | |
|---|---|---|---|---|---|---|
| Glycerine (by weight) | 0 | 0 | 1 | 23 | 50 | 50 |
| $CH_3COONa$ (by weight) | 25 | 10 | 2.5 | 8.0 | 2.5 | 5 |
| Stained area | 100 | 80 | 70 | 0 | 20 | 0 |

Note.—Glycerine and $CH_3COONa$ are expressed in terms of the concentrations of their aqueous solutions.

We claim:

1. In a method of preparing cellulose acetate fibers by gas-phase acetylation of viscose rayon fibers which includes the steps of applying an aqueous solution of alkali acetate onto the viscose rayon fibers, depositing the alkali acetate onto such fibers by removing excess solution and drying the same and exposing the dried fibers to an acetylating gas, the improvement comprising incorporating into the aqueous solution of alkali acetate, and constituting from 10% to 50%, by weight of the aqueous solution, a substance selected from the group consisting of polyethylene glycol, ethylene glycol, glycerine and water soluble polypropylene glycol and acetic acid esters thereof to provide for uniform deposition of alkali acetate on the viscose rayon fibers during removal of excess aqueous solution and drying of the fibers.

2. A method as defined in claim 1 wherein the substance constitutes from 20% to 30%, by weight, of the aqueous solution of alkali acetate.

3. A method as defined in claim 1 wherein said polyhydric alcohol is polyethylene glycol.

4. A method as defined in claim 1 wherein said polyhydric alcohol is ethylene glycol.

5. A method as defined in claim 1 wherein said polyhydric alcohol is glycerine.

6. A method as defined in claim 1 wherein said polyhydric alcohol is water soluble polypropylene glycol.

References Cited

UNITED STATES PATENTS 2,780,511   2/1957   Takagi _____ 8—121
3,045,461   7/1962   Saito _____ 8—121 XR LEON D. ROSDOL, Primary Examiner M. HALPERN, Assistant Examiner U.S. Cl. X.R.

260—227

UNITED STATES PATENT OFFICE
CERTIFICATE OF CORRECTION

Patent No. 3,490,862          Dated January 20, 1970

Inventor(s) Tatsuro Yoda, Takane Nomura and Toshiyuki Harada

It is certified that error appears in the above-identified patent and that said Letters Patent are hereby corrected as shown below:

Col. 2, line 5 "or" should be --of--, line 26, "actalyst" should be --catalyst--. Col. 5, line 29, "plane" should be --place--

SIGNED AND
SEALED
MAY 12 1970

(SEAL)
Attest:

Edward M. Fletcher, Jr.
Attesting Officer

WILLIAM E. SCHUYLER, JR.
Commissioner of Patents